3,775,518
MOLDING NITRILE RESIN COMPOSITIONS
Ryuichi Endo, Matsudo, Japan, assignor to Asahi Kasei Kogyo Kabushiki Kaisha, Osaka, Japan
Filed Apr. 18, 1972, Ser. No. 245,217
Claims priority, application Japan, Apr. 23, 1971, 46/26,109
Int. Cl. C08f 19/08, 19/10, 19/20, 41/12
U.S. Cl. 260—876                                        15 Claims

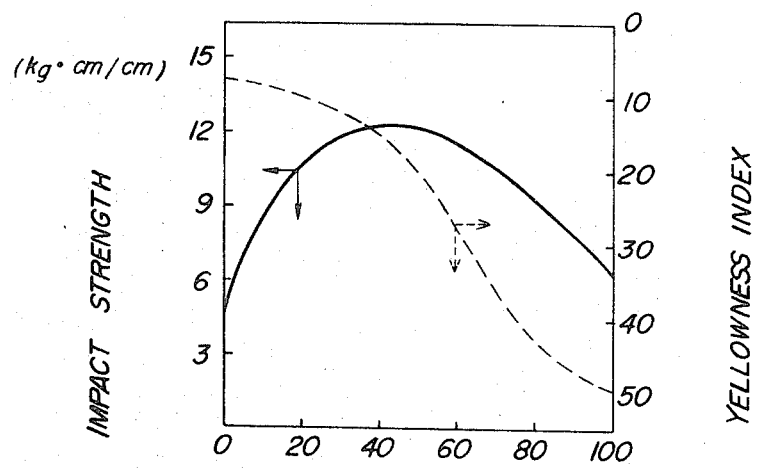
BUTADIENE CONTENT IN RUBBERY POLYMER (%)

ABSTRACT OF THE DISCLOSURE

A molding nitrile resin composition suitable as a material for food-packaging films or food containers which are excellent in processability, transparency, impact resistance, hardness, appearance and gas-impermeability, and which require substantially no heat-stabilizer, is obtained by emulsion-polymerizing in an aqueous medium 95 to 40 parts by weight of a monomeric mixture (a) of 55 to 90% by weight of acrylonitrile or methacrylonitrile and 10 to 45% by weight of a lower alkyl acrylate or a lower alkyl methacrylate, in the presence of 5 to 60 parts by weight of a rubber-like polymer (b) composed of 30 to 80% by weight of an alkyl acrylate or an alkyl methacrylate, 4 to 50% by weight of a conjugated diolefin and 5 to 30% by weight of a vinyl aromatic hydrocarbon. The said composition can be blended, if necessary, with a copolymer obtained by polymerizing in an aqueous medium of the said monomeric mixture (a) in the absence of the said rubber-like polymer (b), in a proportion of up to 100 parts by weight of the copolymer per 100 parts by weight of the said composition, to adjust the content of said rubber-like polymer (b) to any value within the range of 5 to 30% by weight based on the weight of the resulting composition.

---

This invention relates to a molding nitrile resin composition which is reinforced with a rubber-like polymer composed of an acrylate monomer, a conjugated diene monomer and a vinyl aromatic hydrocarbon monomer, and to a process for producing the same. The object of this invention is to provide a molding resin suitable as a material for manufacturing food-packaging films or food containers, which are favorably impermeable to gases, particularly excellent in processibility, transparency, impact resistance, hardness and visual appearance, and require substantially no heat-stabilizer.

It has been known that a copolymer comprising a major proportion of a nitrile monomer such as acrylonitrile, methacrylonitrile, and the like, is superior to other conventional polymers in low permeability to gases such as oxygen, nitrogen and carbon dioxide, and in resistance against chemicals and weathering.

There have also been proposed methods for improving the impact resistance of nitrile copolymers, by use of a rubber-like copolymer of acrylonitrile or styrene with a conjugated diene such as butadiene, isoprene, or the like. Such rubber-reinforced copolymers are disclosed in U.S. Pat. No. 3,426,102 and Belgian Pat. No. 742,439.

These copolymers exhibit adequate processing properties on a commercially available equipment and excellent gas-impermeability, impact resistance, but are poor in thermal stability, and when subjected to heat treatment during molding, are so much yellowed that the addition of a heat stabilizer is indispensable. When these polymers are used in the field of food-packagings and food-containers, the addition of such a stabilizer not only brings about a fatal defect for the polymer in view of food sanitation because of migration of the stabilizer into contents of the packaging, but also often results in the undesirable phenomenon that the shaped packages lose their transparency or are whitened when contacted with water or alcohol.

Under these circumstances, the present inventor has attended to the distinguished gas-impermeability of nitrile resins and conducted intensive research for the purpose of imparting to said resin an improved impact strength and hardness and, moreover, an improved thermal stability while retaining the original transparency, to obtain a molding resin which requires no stabilizer. As a result, the present inventor has found that contrary to the commonly known fact that a polymer comprising acrylonitrile as the main constituent and a rubber comprising a conjugated diene are liable to be deteriorated particularly by heat, it is possible to obtain a resin having an unpredictably high thermal stability without any heat stabilizer and, in addition, satisfactory transparency, impact resistance, hardness and visual appearance, by using as a reinforcing component for the nitrile resin a rubber-like polymer composed of specific amounts of specific three components, i.e. an acrylic acid ester monomer, a conjugated diolefin monomer and a vinyl aromatic hydrocarbon monomer.

Thus, the present invention provides a molding nitrile resin composition comprising a polymer composition (A) obtained by polymerizing in an aqueous medium 95 to 40 parts by weight of a monomeric mixture (a) of 55 to 90% by weight of at least one nitrile represented by the formula:

wherein $R_1$ is hydrogen or an alkyl group having 1 to 2 carbon atoms and 10 to 45% by weight of at least one acrylate represented by the formula:

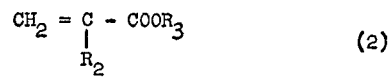

wherein $R_2$ is hydrogen or an alkyl group having 1 to 2 carbon atoms and $R_3$ is an alkyl group having 1 to 4 carbon atoms, in the presence of 5 to 6 parts by weight of a rubber-like polymer (b) composed of 30 to 80% by weight of at least one acrylate represented by the formula:

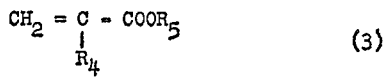

wherein $R_4$ is hydrogen or an alkyl group having 1 to 2 carbon atoms and $R_5$ is an alkyl group having 2 to 10 carbon atoms, 4 to 50% by weight of at least one conjugated diolefine represented by the formula:

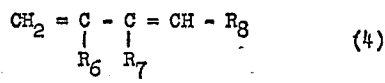

wherein $R_6$ is hydrogen or methyl, $R_7$ is hydrogen, a halogen or an alkyl group having 1 to 2 carbon atoms, and $R_8$ is hydrogen or methyl, and 5 to 30% by weight of at least one vinyl aromatic hydrocarbon represented by the formula:

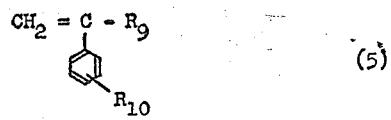

wherein $R_9$ is hydrogen or methyl, and $R_{10}$ is hydrogen, a halogen or methyl; and a polymer (B) obtained by polymerizing in an aqueous medium said monomeric mixture (a) in a proportion of 0 to 100 parts by weight of said polymer (B) per 100 parts by weight of said polymer composition (A), the content of said rubber-like polymer (b) in the final molding nitrile resin composition being 5 to 30% by weight.

The constituents of the rubber-like polymer (b) and their relative proportions are determined according to the object of this invention so as to improve the physical strengths of the nitrile copolymer to the utmost extent, impart the maximum thermal stability to the nitrile copolymer, and make the refractive index of the rubber-like polymer consistent with that of the nitrile copolymer to give the maximum transparency.

The figure in the accompanying drawing shows a relationship of the impact strength and yellowness index of a nitrile resin to the proportion of butadiene in a rubber-like terpolymer composed of 2-ethylhexyl acrylate, butadiene and styrene when said rubber-like terpolymer is used as a reinforcing component in an acrylonitrile-methyl acrylate copolymer. The said figure refers to the case where the constituents of the rubber-like terpolymer other than butadiene are 2-ethylhexyl acrylate and styrene in a weight ratio of 2:1, and the rubber-like terpolymer and the acrylonitrile copolymer are used in a weight ratio of 85:15. The impact strength and yellowness index were measured in a manner as will be mentioned hereinafter. The yellowness indices shown in the figure are the measurement values of a sheet of the resin composition which has been thermally treated at 180° C. for 60 minutes in a rubber aging tester. There is a relationship between the yellowness index and the degree of yellowing of shaped articles, and the present inventor has found that when the yellowness index exceeds 20 under the above-mentioned treatment conditions, the appearance of shaped articles obtained by a practicable molding method is greatly inferior in commercial value due to its yellowing. As is evident from the figure, the yellowness index remains very small in the range specified in this invention, where the butadiene content in the rubber component is 50% by weight or less, whereas the yellowness index rapidly increases when the butadiene content exceeds 50% by weight. On the other hand, when the butadiene content is 4% by weight or less the impact strength is so low that the resin composition no longer meets the purpose of this invention. Further, the range of the contents of a vinyl aromatic hydrocarbon which is one of the constituents of the rubber-like polymer is determined so as to make the refractive index of the rubber-like polymer consistent with that of the nitrile copolymer to impart high transparency to the resin composition moldings and so as to improve the rubbery properties to enhance the reinforcing effect of the resin component.

The kind of the acrylate chosen as a comonomer to be copolymerized with the nitrile, and the ratio of the two are determined for the purpose of retaining to the utmost extent the gas-impermeability characteristic of the nitrile copolymer, of obtaining a polymer uniform in composition to develop the maximum transparency and physical strengths, and, in addition, of improving the processibility of the resin.

The polymerizing of the monomer mixture (a) in an aqueous medium in the presence of the rubber-like polymer (b) aims at uniformly dispersing particles of the rubber-like polymer as the discontinuous phase in the continuous phase of the resulting nitrile copolymer, and, in addition, it intends to enhance the physical strengths of the copolymer resin through graft linkages formed by the reaction between the polymerizing chain radicals and the rubber particles. An emulsion polymerization is especially suited to the said purpose.

The purpose of blending the aforementioned rubber-containing nitrile polymer composition (A) with the rubber-free nitrile copolymer (B) is to manufacture a nitrile resin composition having any desired rubber content by incorporating the nitrile copolymer into a previously prepared polymer composition having a high rubber content, and is not to expect any other special effect upon physical properties which might result from said mixing.

The rubber-like polymer (b) is obtained by polymerizing in an aqueous medium, preferably in the presence of an emulsifier, a monomeric mixture of 30 to 80% by weight of at least one acrylate selected from those having the aforementioned structural Formula 3, preferably from ethyl, propyl, butyl, octyl and 2-ethylhexyl acrylates, and butyl, octyl, 2-ethylhexyl, nonyl and decyl methacrylates, 4 to 50% by weight of at least one conjugated diolefin selected from those having the aforementioned structural Formula 4, preferably from butadiene-1,3, isoprene, chloroprene and 2,3-dimethylbutadiene, and 5 to 30% by weight of at least one vinyl aromatic hydrocarbon selected from those having the aforementioned structural Formula 5, preferably from styrene, $\alpha$-methylstyrene, $\alpha$-chlorostyrene and vinyltoluene. Further, the rubber-like polymer suitable for use in this invention is preferably partially gelated, that is, contains in part a crosslinked structure. Such a rubber-like polymer is known to be inevitably produced in manufacturing a rubber latex from monomeric mixtures comprising a conjugated diolefin as an essential component. It can also be intentionally produced, if necessary, by carrying out the polymerization in the presence of 0.1 to 5.0% by weight, based on the said monomeric mixture, of a divinyl monomer such as divinylbenzene and glycol dimethacrylate. A more preferable rubber-like polymer in this invention is that which contains at least 40% by weight, based on the said rubber-like polymer, of a substance insoluble in methyl ethyl ketone when the rubber-like polymer is extracted with methyl ethyl ketone at 20° C. for 24 hours, said insoluble gel having a swelling degree of 30 or less in methyl ethyl ketone. The swelling degree is defined as a ratio of the weight of gel swollen with methyl ethyl ketone to the weight of dried gel, when the rubber is extracted with said solvent at 20° C. for 24 hours. While the particle diameter of the rubber-like polymer as produced by a conventional emulsion polymerization method is satisfactory in this invention, it is more preferable that said diameter be in the range of 0.1 to 1.0$\mu$, which range is preferred in view of transparency and mechanical strengths of the end product.

The nitrile polymer composition (A) according to this invention is obtained by polymerizing in an aqueous medium, preferably in the presence of an emulsifier, a monomeric mixture (a) of 55 to 90% by weight of at least one nitrile selected from those having the aforementioned structural Formula 1, preferably from acrylonitrile, methacrylonitrile and etharylonitrile and 10 to 45% by weight of at least one acrylate selected from those having the aforementioned structural Formula 2, preferably from methyl acrylate, ethyl acrylate, butyl acrylate, methyl methacrylate and methyl ethacrylate, in the presence of the above-mentioned rubber-like polymer (b). The proportion of the above-mentioned rubber-like polymer (b) in the nitrile polymer composition (A) should be 5 to 30% by weight. When said proportion is less than 5% by weight, as satisfactory reinforcing effect will not be exhibited, while, when said proportion exceeds 30% by weight, there will be deterioration in gas-impermeability, hardness and heat distortion temperature of the resin composition moldings against the object of this invention though a remarkably high impact strength will be attained. Alternatively, in this invention, insofar as the object of this invention is not interfered with, the rubber-containing nitrile polymer composition (A) prepared in the above-mentioned manner and the nitrile copolymer (B), which is obtained by polymerizing in an aqueous medium the mixture (a) of the above-mentioned nitrile and the above-mentioned acrylic acid ester in the absence of a rubber-like polymer, can be blended so as to form a mixture containing 5 to 30% by weight of the rubber-like polymer (b), the blending ratio being up to 100 parts by weight of the rubber-free nitrile copolymer (B) per 100 parts by weight of the said rubber-containing nitrile polymer (A). The blending can be carried out by adopting an ordinary procedure such as, for example, mechanical mixing or milling of both polymers in the form of either an aqueous dispersion or a powder.

The most suitable process for producing the nitrile resin composition of this invention is a method of the emulsion polymerization of the mixture (a) of the above-mentioned nitrile and the above-mentioned acrylate in an aqueous dispersion of the above-mentioned rubber-like polymer (b) using an emulsifier, a polymerization catalyst and a polymerization modifier.

The emulsifier and polymerization catalyst for use in this invention are under no particular restriction, and those which are used in a conventional emulsion polymerization can be used. Examples of emulsifiers for use in this invention include fatty acid soaps, hydrogenated rosin soaps, sodium dialkylsulfosuccinates, sodium long-chain ($C_{12}$–$C_{18}$)-alkylbenzene sulfonates, and sodium alkyl-substituted benzene sulfonates. For the polymerization catalyst, there may be used conventional organic or inorganic peroxides, free-radical generating agents of the azo type, and redox-type catalyst systems comprising combinations of water-soluble peroxides and reducing agents.

The polymerization modifier for use in this invention is under no particular restriction. Conventional sulfur-containing compounds such as aliphatic mercaptans and organic polysulfides can be used. However, in the field of food-packaging and food containers, which is the objective use-field for the end product of this invention, there are required non-toxicity and odorlessness of the materials. Consequently, in such a case, the polymerization modifier is preferably selected from those which have less disagreeable odor characteristic of a sulfur-containing compound. Particularly suitable modifiers are polymercaptans such as glycerol trithioglycolate, trimethylolpropane trithioglycolate and pentaerythritol tetrathioglycolate. The amount of a mercaptan to be used is generally 0.1 to 6 parts by weight, preferably 0.5 to 3 parts by weight, per 100 parts by weight of the above-mentioned monomers.

The suitable temperature for conducting the polymerization reaction depends on the type of the polymerization catalyst, but is preferably in the range of 30° to 60° C. At a temperature outside the said range, either a long time is required in polymerization or the control of polymerization becomes difficult. The polymer obtained by emulsion polymerization is in the form of a stable dispersion. On addition of a coagulant, such as, for example, aluminum sulfate or sodium chloride, to said dispersion, the polymer is coagulated. The coagulated polymer is washed, filtered, and dried to obtain a resin powder, which can be shaped by a melt-molding process, such as extrusion molding, injection molding, compression molding or powder molding, into various articles such as rods, sheetings, pipes, plates, bottles, etc. The resin powder can also be dissolved or dispersed in a solvent for nitrile resins, such as dimethylformamide, a nitroalkyl or a cyanoalkyl, to be shaped in known ways into threads, cords and films.

EXAMPLE 1

A rubber-like polymer latex is obtained by heating the following components in an autoclave provided with a stirrer.

| | Parts by weight |
|---|---|
| Water | 200 |
| 2-ethylhexyl acrylate | 45 |
| Butadiene | 30 |
| Styrene | 25 |
| Sodium soap of semihardened beef tallow | 1.5 |
| Sodium salt of condensed naphthalenesulfonic acid | 0.2 |
| N,N'-abobisisobutyronitrile | 0.4 |

Butadiene is added into the tightly sealed autoclave, in which the air has been replaced with nitrogen. The temperature of the reactor is kept at 50° C. for about 24 hours until conversion of the monomer mixture reaches 95%. The resulting polymer showed a gel content of 72% by weight and a swelling degree of 22.

Then, the above-obtained rubber-like polymer latex and the following components are charged into a reactor equipped with a stirrer.

| | Parts by weight |
|---|---|
| The said rubber-like polymer latex (as resin) | 15 |
| Acrylonitrile | 70 |
| Methyl acrylate | 30 |
| Sodium dioctylsulfosuccinate | 0.85 |
| Glycerol trithioglycolate | 1.8 |
| Pottasium persulfate | 0.06 |
| Water (including water in the rubber-like polymer latex) | 270 |

The mixture in the reactor is stirred to form a uniform emulsion and the air in the reactor is replaced with nitrogen. The reaction is allowed to proceed while being stirred at 50° C. for about 8 hours until the conversion of the monomer mixture reaches 90%. After the reaction is completed, the reaction mixture is admixed with an aqueous solution of aluminum sulfate and heated at about 60° C. to coagulate the reaction product. The coagulated product is filtered, washed, and then dried by heating at 60° C. until a constant weight is reached, to obtain a white copolymer resin powder.

The copolymer obtained shows a melt index (measuring procedure is given hereinafter) of 2.0 to 190° C.

The copolymer is granulated by means of an extruder and compression-molded at 180° C. under a pressure of 200 kg./cm.$^2$ to obtain a sheet, 3 mm. in thickness, physical properties of which are as shown in Table 1.

TABLE 1

| | |
|---|---|
| Light transmittance (percent) | 91.0 |
| Yellowness index (before heat treatment) | 6.8 |
| Yellowness index (after heat treatment) | 13.2 |
| Izod impact strength (kg.·cm./cm.) | 12.8 |
| Heat distortion temperature (° C.) | 62.5 |

The testing methods and units are as follows.

Melt index: measured in accordance with ASTM Testing Method D-1238-62T and the quantity, in g./10 min., of the polymer extruded from a melt indexer at 190° C. under a load of 12.5 kg. is indicated as melt index.

Light transmittance: measured in accordance with ASTM Testing Method D-1746-62T on a sheet, 1 mm. in thickness, and indicated in percent.

Yellowness index: measured in accordance with ASTM Testing Method D-1925-63T on a sheet, 1 mm. in thickness. In order to show the change in yellowness index of the copolymer resin caused by the heat treatment, the yellowness index of the sheet after having been treated in a rubber aging tester at 180° C. for 60 minutes is shown along with the value before the heat treatment for comparison.

Izod impact strength: measured in accordance with ASTM Testing Method D-648-56 on notched specimens at 20° C. and indicated in kg.·cm./cm.

Heat distortion temperature under load: measured in accordance with ASTM Testing Method D-648-56 and indicated in ° C.

From the above results, it is seen that the copolymer resin composition of this invention shows a melt characteristic which is particularly suitable for extrusion molding, and has a high transparency, impact strength and thermal stability so that the resin is processable without using any heat-stabilizer.

EXAMPLE 2

Using the rubber-like polymer latex obtained in Example 1, the following components are charged into a reactor equipped with a stirrer.

| | Parts by weight |
|---|---|
| Rubber-like polymer latex in Example 1 (as resin) | 20 |
| Acrylonitrile | 40 |
| Methacrylonitrile | 40 |
| Ethyl acrylate | 20 |
| Sodium dioctylsulfosuccinate | 0.9 |
| Pentaerythritol tetrathioglycolate | 1.0 |
| Potassium persulfate | 0.15 |
| Sodium sulfite | 0.50 |
| Water (including water in the rubber-like polymer latex) | 270 |

The contents of the reactor are stirred into a uniform emulsion and the air in the reactor is replaced with nitrogen. The emulsion is allowed to react while being stirred at 40° C. for about 8 hours. After the reaction is completed, the reaction mixture is admixed with an aqueous solution of aluminum sulfate and heated at about 60° C. to coagulate the reaction product. The coagulated product is filtered, washed, and then dried by heating at about 60° C. until a constant weight is reached, to obtain a white copolymer resin powder.

The copolymer obtained has a melt index of 5.2 at 190° C. The sheet which has been compression-molded from the resin powder shows a light transmittance of 88%, a yellowness index of 12.2, an Izod impact strength of 6.0 kg.·cm./cm. and a heat distortion temperature of 72.6° C.

On the other hand, a copolymer resin is obtained in the same manner as mentioned above, except that the rubber-like copolymer latex is omitted from the charge recipe. The sheet formed from the resulting copolymer resin is brittle, the Izod impact strength being as extremely low as 1.2 kg.·cm./cm.

EXAMPLES 3–5

In the same manner as in Example 1, rubber-like polymer latices are obtained from monomeric mixtures of the composition as shown in Table 2.

TABLE 2

| Example | 3 | 4 | 5 |
|---|---|---|---|
| Monomer: | | | |
| Butadiene (parts by weight) | 10 | 25 | 40 |
| 2-ethylhexyl acrylate (parts by weight) | 65 | 50 | 35 |
| Styrene (parts by weight) | 25 | 25 | 25 |

In the same manner as in Example 1, copolymer resin powders are obtained by polymerizing 10 parts by weight (as resin) of each of the rubber-like polymer latices, 75 parts by weight of acrylonitrile and 25 parts by weight of methyl acrylate. Properties of the copolymers are as shown in Table 4 which is given later.

COMPARATIVE EXAMPLES 1–4

TABLE 3

| Comparative Example | 1 | 2 | 3 | 4 |
|---|---|---|---|---|
| Monomer: | | | | |
| Butadiene (parts by weight) | 70 | 60 | 100 | 70 |
| 2-ethylhexyl acrylate (parts by weight) | | 15 | | |
| Styrene (parts by weight) | 30 | 25 | | |
| Acrylonitrile (parts by weight) | | | | 30 |

For comparison, rubber-like polymer latices are prepared from monomeric mixtures shown in Table 3, and copolymer powders are obtained in a manner similar to that in Example 3. The properties of the copolymers are as shown in Table 4 which is given later.

From the results shown in Table 4, it is seen that the copolymer resins obtained in Examples 3 and 4 show an excellent thermal stability, transparency and impact strength, all of which meet the object of this invention, whilst the copolymer resins obtained in Comparative Examples 1–4 do not meet the requirements in said three major characteristics. Particularly, as compared with the copolymer resins obtained according to this invention, the nitrile copolymer resins obtained in Comparative Examples 1 and 4, which contain either a butadiene-styrene copolymer rubber or a butadiene-acrylonitrile copolymer rubber as a reinforcing component, show much higher yellowness indices owing to discoloration caused by the heat-treatment, clearly indicating that the addition of an effective heat-stabilizer is indispensable.

TABLE 4

| | Light transmittance, percent | Izod impact strength, kg.cm./cm. | Yellowness index Before heat treatment | Yellowness index After heat treatment |
|---|---|---|---|---|
| Example: | | | | |
| 3 | 89 | 6.2 | 6.0 | 11.8 |
| 4 | 90 | 7.8 | 6.3 | 14.2 |
| 5 | 92 | 8.2 | 8.2 | 15.8 |
| Comparative Example: | | | | |
| 1 | 75 | 6.9 | 14.3 | 32.6 |
| 2 | 61 | 4.9 | 11.3 | 28.3 |
| 3 | 82 | 5.8 | 16.2 | 38.8 |
| 4 | 86 | 14.1 | 21.6 | 63.8 |

EXAMPLE 6

In the same manner as in Example 1, a rubber-like polymer latex is obtained from a monomeric mixture comprising 20 parts by weight of isoprene, 10 parts by weight of styrene and 70 parts by weight of butyl acrylate. Then, 25 parts by weight (as resin) of the said rubber-like polymer latex, 70 parts by weight of acrylonitrile, 20 parts by weight of methyl acrylate and 10 parts by weight of methyl methacrylate are polymerized in the same manner as in Example 2 to obtain a copolymer resin powder.

The said copolymer has a melt index of 2.0 at 190° C., and the sheet compression-molded from the resin powder shows a light transmittance of 86%, a yellowness index of 9.3, an Izod impact strength of 14.8 kg.·cm./cm. and a heat distortion temperature of 66.5° C.

On the other hand, 40 parts by weight of a copolymer resin powder, which has been obtained in the same manner as above except for omission of the rubber-like polymer latex from the above-said charge recipe, and 60 parts by weight of the above-obtained rubber-reinforced resin powder are mixed, then milled on a hot roll mill at 160° C. for 15 minutes and compression-molded to obtain a transparent and tough sheet, which shows a light transmitttance of 84%, a yellowness index of 12.4, an Izod impact strength of 8.4 kg.·cm./cm. and a heat distortion temperature of 67.5° C.

EXAMPLES 7–12 AND COMPARATIVE EXAMPLES 5–8

A rubber-like polymer latex is obtained from a monomer mixture having a composition shown in Table 5 in the same manner as in Example 1.

TABLE 5

| Number of rubber-like polymer | A | B | C | D | E | F | G | H |
|---|---|---|---|---|---|---|---|---|
| Butadiene (parts by weight) | 30 | 30 | 10 | 45 | 50 | 20 | 10 | 0 |
| Octyl acrylate (parts by weight) | 50 | 50 | 70 | 40 | 25 | 35 | 85 | 70 |
| α-Methylsytrene (parts by weight) | 20 | 20 | 20 | 15 | 25 | 40 | 5 | 30 |
| Ethylene glycol methacrylate (parts by weight) | 0.8 | 1.0 | 0.5 | 0.5 | | 1.0 | | 1.0 |

In the presence of each of the above rubber-like polymer latices, acrylonitrile and methyl acrylate are polymerized in proportions as shown in Table 6 in the same manner as in Example 1 until the conversion of the monomer mixture reaches 90%, to obtain a copolymer resin. The properties of the thus obtained resins are as shown in Table 7.

TABLE 6

| No. | Rubber-like polymer Amount (as resin) (parts by weight) | Acrylonitrile (parts by weight) | Methyl acylate (parts by weight) |
|---|---|---|---|
| Example: | | | |
| 7 | A | 13 | 77 | 23 |
| 8 | B | 13 | 77 | 23 |
| 9 | B | 13 | 65 | 35 |
| 10 | C | 13 | 80 | 20 |
| 11 | C | 18 | 80 | 20 |
| 12 | D | 13 | 77 | 23 |
| Comparative Example: | | | |
| 5 | E | 13 | 77 | 23 |
| 6 | F | 13 | 77 | 23 |
| 7 | G | 13 | 77 | 23 |
| 8 | H | 13 | 77 | 23 |

TABLE 7

| | Light transmittance (percent) | Izod impact strength (kg.cm./cm.) | Heat distortion temperature (° C.) | Yellowness index after heat treatment |
|---|---|---|---|---|
| Example: | | | | |
| 7 | 89 | 7.2 | 67.5 | 12.3 |
| 8 | 89 | 16.8 | 68.0 | 11.6 |
| 9 | 88 | 29.2 | 57.5 | 8.4 |
| 10 | 86 | 6.3 | 69.5 | 11.2 |
| 11 | 84 | 14.9 | 66.0 | 18.4 |
| 12 | 82 | 18.4 | 66.5 | 14.3 |
| Comparative Example: | | | | |
| 5 | 73 | 12.8 | 67.0 | 32.4 |
| 6 | 62 | 4.2 | 67.5 | 12.3 |
| 7 | 58 | 6.3 | 67.0 | 9.0 |
| 8 | 82 | 4.8 | 65.0 | 9.3 |

It is clearly seen from Table 7 that Examples 7–12 produce copolymer resins which require substantially no heat-stabilizers because of having greatly superior thermal stability as compared with Comparative Examples 5–8 and simultaneously have good transparency, high impact strength and heat distortion temperature enabling the resins to be used in practice copolymer latex.

EXAMPLE 13

In the same manner as in Example 1, 40 parts by weight (as resin) of the rubber-like polymer latex obtained in Example 6, 45 parts by weight of acrylonitrile and 15 parts by weight of methyl acrylate are polymerized at 55° C. for 7 hrs. The conversion of the monomer mixture is 89%. Fifty parts by weight (as resin) of the said latex of a rubber-containing polymer are mixed with 50 parts by weight (as resin) of a copolymer latex obtained, in a manner similar to that mentioned above, by emulsion-polymerizing 75 parts by weight of acrylonitrile and 15 parts by weight of methyl acrylate in the absence of said rubber-like polymer latex. The resulting mixed latex is salted out, washed with water, and dried to obtain a white copolymer resin powder. The sheet formed by compression-molding from the said resin powder shows a light transmittance of 84%, a yellowness index of 8.6, an Izod impact strength of 12.6 kg.·cm./cm., and a heat distortion temperature of 62.8° C.

EXAMPLE 14

Using the rubber-like polymer latex obtained in Example 7, the following components are charged into a reactor equipped with a stirrer.

| | Parts by weight |
|---|---|
| Rubber-like polymer latex obtained in Example 7 (as resin) | 10 |
| Acrylonitrile | 75 |
| Butyl acrylate | 25 |
| Sodium lauryl sulfate | 1.2 |
| Pentaerythriol tetrathioglycolate | 2.5 |
| Potassium persulfate | 0.15 |
| Water (including water in the rubber-like polymer latex) | 270 |

The contents of the reactor are stirred to form a uniform emulsion and then allowed to react under a nitrogen stream while being stirred at 55° C. for 7 hours. Conversion is 93%. Then, the reaction mixture is coagulated by heating at about 60° C. The coagulated product is filtered, washed and then dried by heating at about 60° C. for 48 hours to obtain white powder of a copolymer resin.

The melt index of the polymer is 1.2 at 190° C. The sheet, which is obtained by granulating the polymer by means of an extruder and then compression-molding the granules at 180° C. under a pressure of 200 kg./cm.$^2$, shows a light transmittance of 87% and an Izod impact strength of 6.8 kg.·cm./cm.

On the other hand, the resin powder is dissolved in acetonitrile, then freed from the insoluble gel by suction filtration, cast on a glass plate and dried in a drying oven at 60° C. for 24 hours. The film stripped off from the glass plate is about 50μ thick and is transparent, tough and stiff. The oxygen-permeability of the film is 0.102 ml.·mm./m.$^2$·24 hr.·atm., which is lower than the oxygen-permeability of 0.210 ml.·mm./m.$^2$·24 hr.·atm. of a vinylidene chloride-based film.

When there is produced according to the present invention a nitrile resin which is reinforced with a rubber-like polymer composed of an acrylate, a conjugated diolefin and a vinyl aromatic hydrocarbon in the specified proportions, which proportions have heretofore never been used for the same purpose as that of the present invention, as is clear from the results obtained in the examples and the comparative examples, the said reinforced nitrile resin is suitable as a material for food packaging films and food containers which are excellent in gas-impermeability, processibility, thermal stability, transparency, impact resistance, hardness and visual appearance and require substantially no heat-stabilizer, these properties having heretofore never been realized by the prior art.

What is claimed is:

1. A molding nitrile resin composition produced by the process of claim 14.
2. A composition according to claim 1, wherein the acrylate represented by the Formula 3 is butyl acrylate, octyl acrylate, or 2-ethylhexyl acrylate.
3. A composition according to claim 1, wherein the conjugated diolefin represented by the Formula 4 is butadiene or isoprene.
4. A composition according to claim 2, wherein the conjugated diolefin represented by the Formula 4 is butadiene or isoprene.
5. A composition according to claim 1, wherein the vinyl aromatic hydrocarbon represented by the Formula 5 is styrene or α-methylstyrene.
6. A composition according to claim 4, wherein the vinyl aromatic hydrocarbon represented by the Formula 5 is styrene or α-methylstyrene.
7. A composition according to claim 1, wherein the nitrile represented by the Formula 1 is acrylonitrile or methacrylonitrile.
8. A composition according to claim 6, wherein the nitrile represented by the Formula 1 is acrylonitrile or methacrylonitrile.
9. A composition according to claim 1, wherein the acrylate represented by the Formula 2 is methyl acrylate, ethyl acrylate or methyl methacrylate.
10. A composition according to claim 8, wherein the acrylate represented by the Formula 2 is methyl acrylate, ethyl acrylate or methyl methacrylate.
11. A composition according to claim 1, wherein the rubber-like polymer (b) contains at least 40% by weight of a substance insoluble in methyl ethyl ketone when extracted with the latter at 20° C. for 24 hours and said insoluble substance has a swelling degree of 30 or less in methyl ethyl ketone.
12. A composition according to claim 1, the rubber-like polymer (b) is a polymer prepared by polymerizing the monomer mixture in the presence of 0.1–5.0 parts by weight of divinyl benzene or glycol diacrylate per 100 parts by weight of the monomer mixture.

13. A composition according to claim 1, wherein the rubber-like polymer (b) has a particle diameter in the range of 0.1 to 1.0μ.

14. A process for producing a molding nitrile resin composition, which comprises polymerizing 30 to 80% by weight of at least one acrylate of the formula, $$CH_2 = C - COOR_5 \atop R_4 \qquad (3)$$

wherein $R_4$ is hydrogen or an alkyl group having 1 or 2 carbon atoms and $R_5$ is an alkyl group having 2 to 10 carbon atoms, 4 to 50% by weight of at least one conjugated diolefin of the formula, $$CH_2 = C - C = CH - R_8 \atop R_6 \quad R_7 \qquad (4)$$

wherein $R_6$ is hydrogen or methyl $R_7$ is hydrogen, chloride or an alkyl group having 1 or 2 carbon atoms, and $R_8$ is hydrogen or methyl, and 5 to 30% by weight of at least one vinyl aromatic hydrocarbon of the formula, $$CH_2 = C - R_9 \atop \underset{R_{10}}{\bigcirc} \qquad (5)$$

wherein $R_9$ is hydrogen or methyl, and $R_{10}$ is hydrogen, chloride or methyl, in an aqueous medium in the presence of an emulsifier, a polymerization catalyst and a polymerization modifier to produce a rubber-like polymer (b), and then polymerizing 95 to 40 parts by weight of a monomeric mixture (a) comprising 55 to 90% by weight of at least one nitrile of the formula, $$CH_2 = C - CN \atop R_1 \qquad (1)$$

wherein $R_1$ is hydrogen or an alkyl group having 1 or 2 carbon atoms, and 10 to 45% by weight of at least one acrylate of the formula, $$CH_2 = C - COOR_3 \atop R_2 \qquad (2)$$

wherein $R_2$ is hydrogen or an alkyl group having 1 or 2 carbon atoms and $R_3$ is an alkyl group having 1 to 4 carbon atoms, in an aqueous medium at 30° to 60° C. in the presence of an emulsifier, a polymerization catalyst, a polymerization modifier and 5 to 60 parts by weight of said rubber-like polymer (b).

15. A process according to claim 14, wherein 100 parts by weight of the nitrile resin composition produced is mixed with up to 100 parts by weight of a polymer separately obtained by polymerizing the monomeric mixture (a) at 30° to 60° C. in an aqueous medium containing a polymerization catalyst and a polymerization modifier in the absence of the rubber-like polymer (b), so that the content of the rubber-like polymer (b) in the mixed resin composition may amount to 5 to 30% by weight.

References Cited
UNITED STATES PATENTS
3,401,213   9/1968   Trementozzi et al. ____ 260—879
3,426,102   2/1969   Solak et al. _____ 260—879
3,591,657   7/1971   Ide et al. _____ 260—876

PAUL LIEBERMAN, Primary Examiner

J. ZIEGLER, Assistant Examiner

U.S. Cl. X.R.
260—880